(No Model.) 4 Sheets—Sheet 2.
A. ZANARDO.
MACHINE FOR CUTTING AND CARVING MARBLE, &c.
No. 554,852. Patented Feb. 18, 1896.
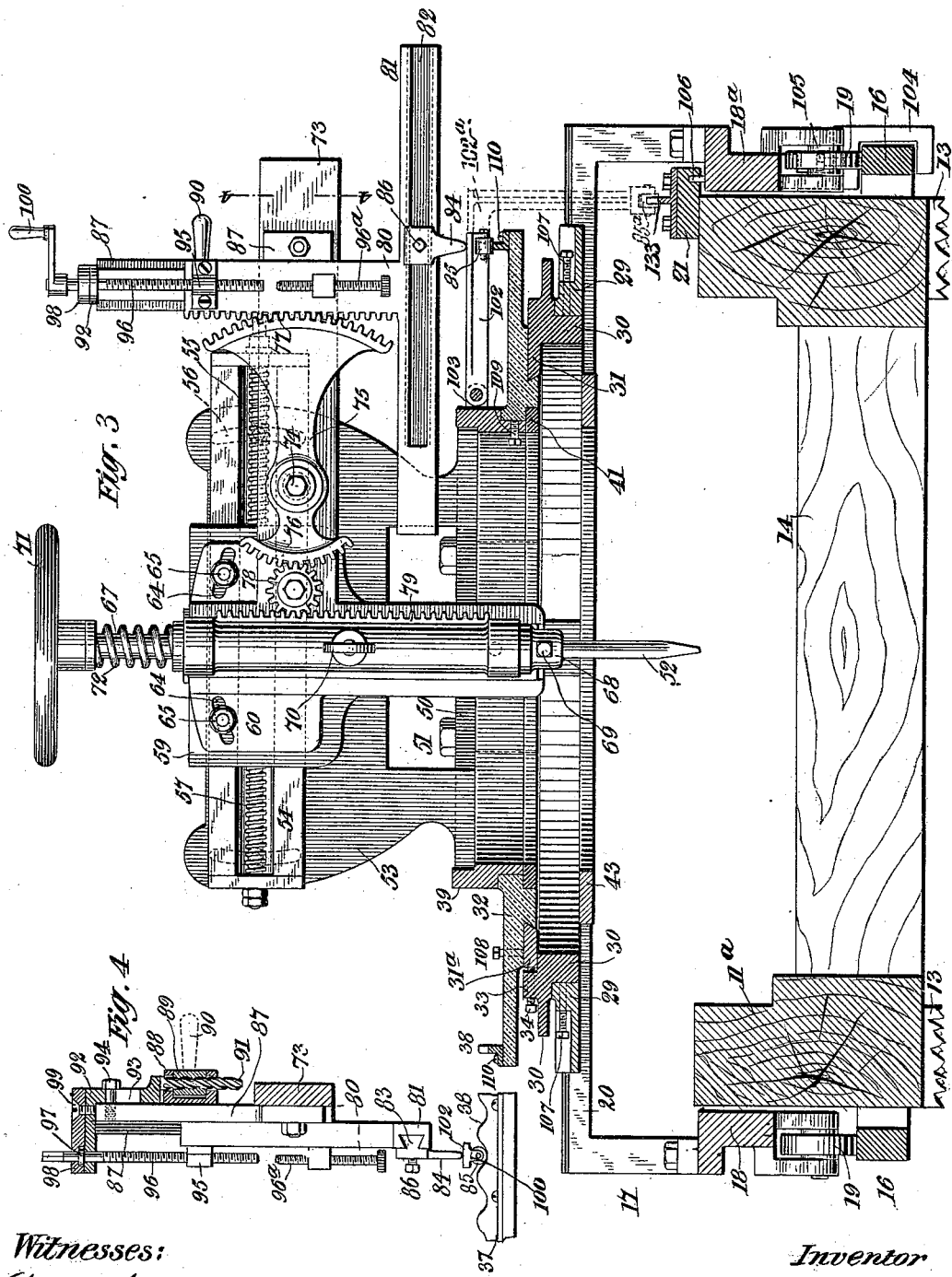
Witnesses:
Raphael Netter
W. E. Bowen
Inventor
Antonio Zanardo (No Model.) 4 Sheets—Sheet 3.
A. ZANARDO.
MACHINE FOR CUTTING AND CARVING MARBLE, &c.
No. 554,852. Patented Feb. 18, 1896.
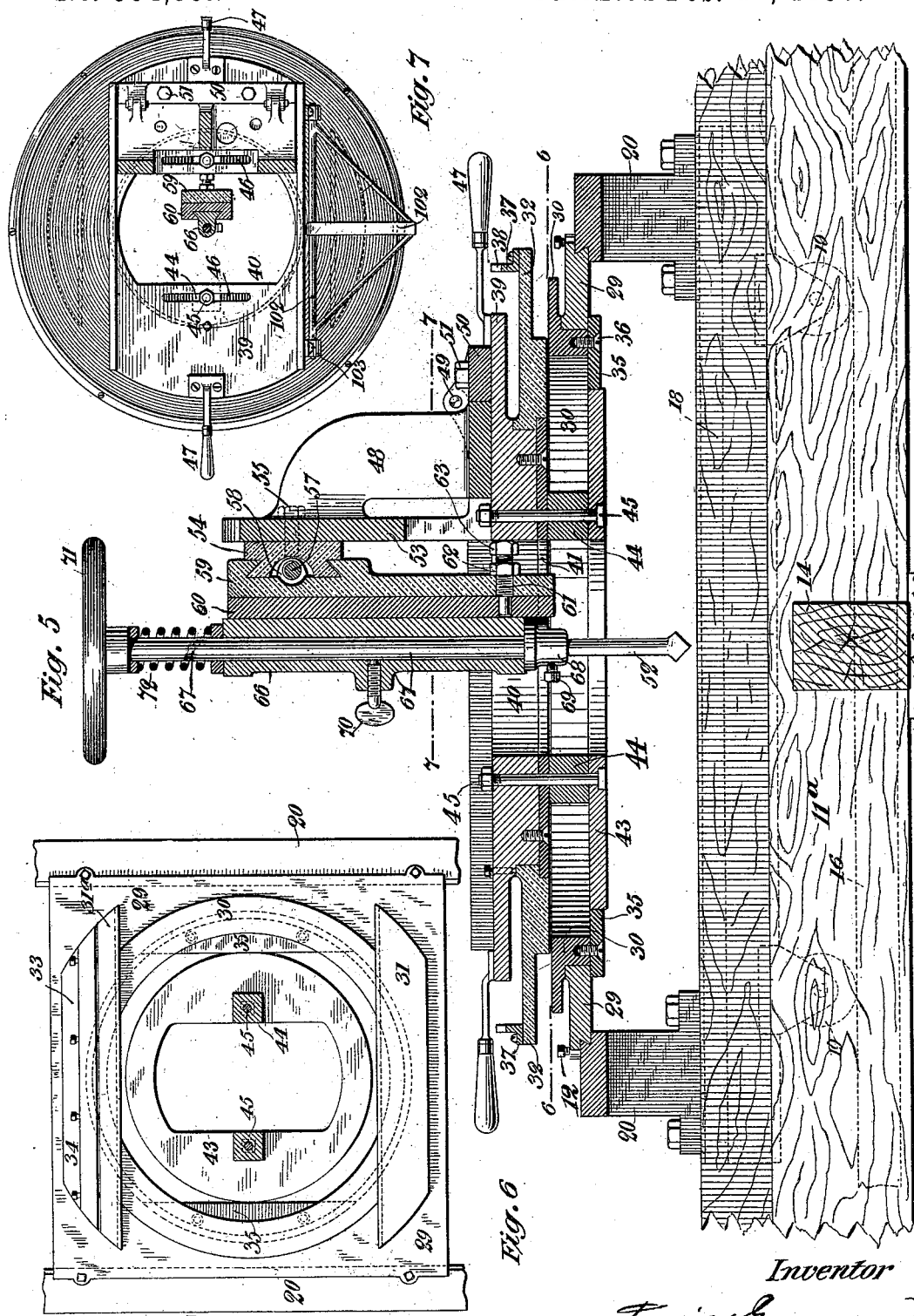
Witnesses: Raphaël Netter
W. E. Bowen
Inventor
Antonio Zanardo (No Model.) 4 Sheets—Sheet 4.
A. ZANARDO.
MACHINE FOR CUTTING AND CARVING MARBLE, &c.
No. 554,852. Patented Feb. 18, 1896.
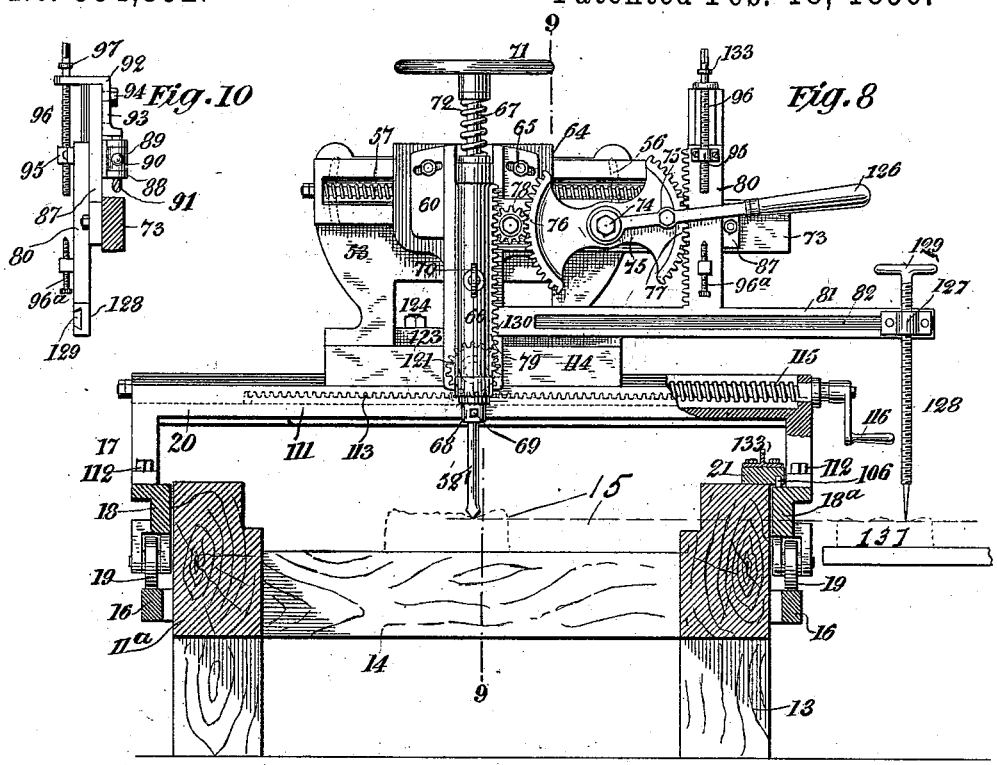
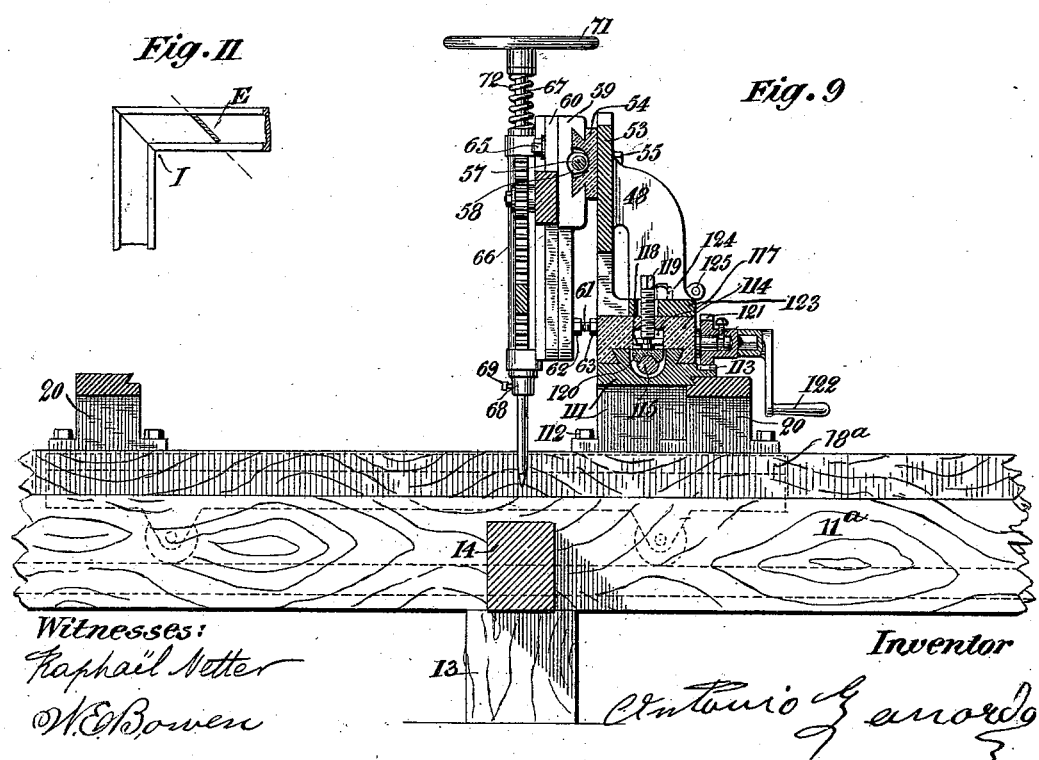
Witnesses:
Raphaël Netter
W. E. Bowen
Inventor
Antonio Zanardo

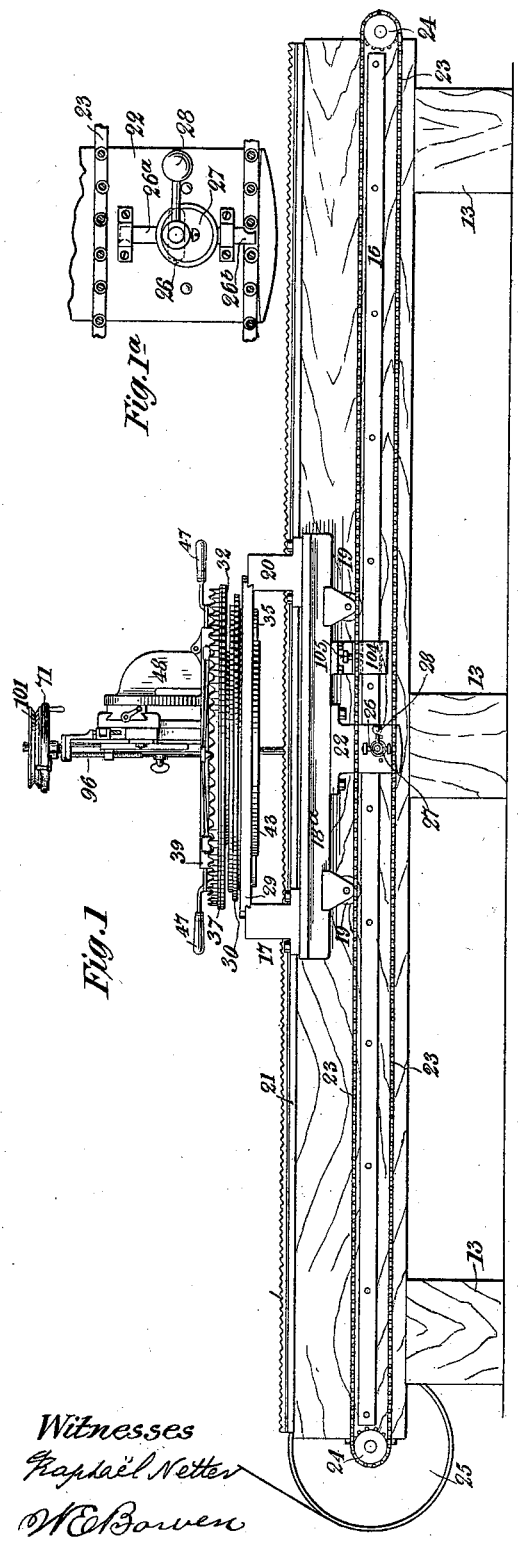

UNITED STATES PATENT OFFICE.

ANTONIO ZANARDO, OF NEW YORK, N. Y., ASSIGNOR TO THE ZANARDO STONE CARVING MACHINE COMPANY, OF NEWARK, NEW JERSEY.

MACHINE FOR CUTTING AND CARVING MARBLE, &c.

SPECIFICATION forming part of Letters Patent No. 554,852, dated February 18, 1896.

Application filed December 7, 1894. Serial No. 531,101. (No model.)

*To all whom it may concern:*

Be it known that I, ANTONIO ZANARDO, a subject of the King of Italy, and a resident of New York, in the county of New York and State of New York, have invented certain new and useful Improvements in Machines for Cutting and Carving Marble and other Stones, of which the following is a specification.

My invention has reference to machines for cutting and carving marble and other stones and for reproducing sculpture of any description.

The object of my invention is to embody in a single organization a machine capable, by suitable adjustments of its mechanism, of producing either round or oval work of any desired diameter or elongation; also capable of use as a planer or as a drill, and also adapted for reproducing or copying figures on different planes, whether embossed or in intaglio. By the peculiar organization of my machine I am further able to accomplish certain descriptions of work in marble and stone which heretofore could not be successfully produced by any known machinery—such, for example, as the cutting of a molding turned at any desired angle, making the corners of angles perfect, and by the use of a single tool.

To enable those interested in the art to construct and make use of my invention I have hereinafter described the same and its mode of operation in connection with the accompanying drawings, and in the claims at the end hereof I have set forth the features of novelty and combinations for which I desire the protection of Letters Patent.

In the accompanying drawings, which form part of this specification, and in which like figures and letters of reference indicate like parts in the several views, Figure 1 is a view in elevation of a machine embodying my invention. Fig. 1ª is a detail drawing of mechanism for connecting the tool-carriage with an endless chain employed to propel the same. Fig. 2 is a plan view of Fig. 1. Fig. 3 is a cross-section on the line 3 3 of Fig. 2. Fig. 4 is a section on the line 4 4 of Fig. 3. Fig. 5 is a central longitudinal section on the line 5 5 of Fig. 2. Fig. 6 is a section through the line 6 6 of Fig. 5. Fig. 7 is a section on the line 7 7 of Fig. 5, Figs. 6 and 7 showing details of the adjustable table or bed hereinafter described. Figs. 8, 9 and 10 show certain features of the complete organization hereinafter explained, Fig. 8 being a cross-section of the superstructure and parts of the mechanism mounted thereon which are adapted to operate as a planer in the production of straight and angular moldings, and which are also adapted to reproduce sculpture, and to perform all the usual drilling operations, Fig. 9 being a section on the line 9 9 of Fig. 8 and Fig. 10 an end view of an adjusting device illustrated in Fig. 8. Fig. 11 shows a ground plan of a portion of an angular molding with a tool indicated in horizontal section in an operative position for making such molding according to my invention. The figures are drawn to different scales, Figs. 1 and 2, which illustrate the whole of the apparatus, being drawn to the smallest scale.

In the operation of the mechanism of Figs. 8, 9 and 10 in the production of angular moldings, the movements utilized are, first, that of the carriage on the track of the superstructure, and, secondly, the lateral or transverse movement adapted to be imparted to the tool-carrier. The reproduction of sculpture is accomplished by fixing on an arm of the tool-carrier a pointer and connecting the said arm by suitable gearing to the cutting-tool or drill in such a manner that the latter is compelled to follow all the movements of the pointer as it travels over the model to be copied, the cutting-tool being caused at the same time to revolve as an ordinary drill.

The machine as organized in Figs. 1 to 7 is adapted not only for performing the ordinary straight work of a planer and for turning moldings at any desired angle, but also for producing round and oval work of any desired description.

The cutting-tool, while operating upon a horizontal surface, is adapted to have imparted to it during its revolution a vertically-reciprocating movement, and in this way delicate and varied designs of work may be produced.

Referring to the drawings, it will be seen that the mechanism is supported by a superstructure the longitudinal beams of which are indicated by 11ª, the legs by 13, and the cross-beams, which may also serve to support the stone, by 14. This supporting structure may be of any suitable design and dimensions.

15 is the stone or marble to be operated upon. (See Fig. 8, for example.)

On the outside of the longitudinal beams 11ª are arranged tracks 16, upon which the carriage travels which supports the operating mechanism. The carriage is indicated by 17 and comprises parallel side bars 18 18ª, which are equipped with wheels 19, as shown, and which are adapted to travel on the tracks 16. At the ends of the carriage 17 there are mounted upon and bolted to the longitudinal beams 18 18ª the transverse bars 20, the inner longitudinal edges of which are provided with dovetail grooves, as shown, to receive the similarly-formed edges of the lowermost plate of the operating mechanism and to permit the latter to be transversely adjusted with reference to the carriage 17. To prevent vertical movement of the carriage 17 on the tracks 16 is the purpose of the stop or stringer 21, which, as shown in Fig. 8, is fixed to one of the longitudinal beams 11 and overhangs an offset of side bar 18ª of the carriage.

Referring now particularly to Figs. 1 to 7, inclusive, the carriage 17 is provided at one side with a depending piece 22, which is bolted to one of the side bars of the carriage and which through proper intermediate appliances co-operates with the chain 23, which, in connection with the sprocket-wheels 24 on shafts at the respective ends of the supporting structure, serves to impart to the carriage 17 the necessary motion back and forth. To the shaft carrying one of said sprocket-wheels there is affixed the pulley 25 to receive the driving-belt from the source of power.

As shown more particularly in Fig. 1ª, 26 is a ring mounted on the face of depending piece 22 and containing an eccentric 27, said ring being provided with an upper arm, 26ª, and a lower arm, 26ᵇ, both adjusted to slide vertically within suitable guides on said depending piece, and both provided near their outer ends with notches capable of engaging with the cross-bars forming parts of the links in chain 23. Eccentric 27 is provided with a hand-lever 28, whereby it may be revolved within ring 26 and raising and lowering of arms 26ª and 26ᵇ may be accomplished, so as to alternately bring the same in operative contact with the links of the two opposite branches of sprocket-chain 23. Eccentric 27 and ring 26 are held in contact with depending piece 22 by the rear end of the axle of lever 28, properly guided therein in a suitable slot. It will be seen that when bar 26ª is forced upward the same, with eccentric 27, depending piece 22, and the carriage itself, will be conducted by the upper branch of endless chain 23 in the direction in which the same is traveling, while the forcing downward of the bar 26ᵇ will effect engagement of its lower extremity with the lower branch of such chain and consequently movements of all the parts of the apparatus above mentioned in the opposite direction. While in this form of the apparatus the reversing of the movement of the carriage must be accomplished through operating lever 28 by hand, as described, means may be provided for accomplishing the reversal of the movement of the carriage automatically at any desired point.

The numeral 29 indicates the lowermost plate of the operating mechanism in engagement with and capable of sliding along the dovetailed edges of transverse bars 20, and 12 12 are bolts for fixedly connecting said plate to said bars. Said plate is provided with a large central circular aperture.

The numeral 30 indicates an annular frame resting upon the inner portion of the upper surface of plate 29 and so in engagement with the inner vertical walls of such plate that frame 30, while firmly resting on said plate and secured against lateral movement with reference to it, may be revolved within its circular aperture.

31 is a guide-piece provided on top of and made integral with one side of frame 30, and 31ª another guide-piece placed parallel to guide-piece 31 and on the opposite side of the upper surface of said frame, it being, however, so detached from said frame as to be capable of adjustment toward and from guide-piece 31. The straight inner edges of said guide-pieces dovetail with the lower portions of two sides of a frame 32, resting on frame 30, and it is for the purpose of making the adjustment of such dovetailed connection feasible that guide-piece 31ª is detached from frame 30.

33 is an abutment made integral with frame 30 and placed parallel with and in the rear of guide-piece 31ª.

34 34 are set-screws passing through said abutment and resting against said guide-piece, whereby the same may be forced inward sufficiently to secure proper operative contact with its dovetailed surface and the corresponding portion of frame 32.

35 35 are two cheeks with straight parallel inner guiding-surfaces and so secured to the under side of frame 30 by screws 36 as to bring their upper surfaces also in close contact with part of the under side of plate 29, and it will be seen that thus frame 30, together with cheeks 35, will form one body capable of revolving within the aperture of plate 29 without the possibility of becoming detached from said plate.

Frame 32, forming an annular plate and resting on frame 30, carries near its outer edge a pattern in the form of a detachable rim 37 extending upwardly and provided with curving teeth 38, thus giving its upper edge an undulating configuration, as shown more particularly in Fig. 1.

39 is a plate mounted on annular plate 32 so as to penetrate into and revolve within the circular aperture of the latter. Said plate 39 is oblong, having two parallel sides and curving ends, and is provided with a cross-aperture 40 of a similar form, its straight sides running at right angles to the straight flanged outer sides of said plate. Through this aperture the tool is made to operate.

41 is a circular flange attached to the under side of plate 39 by screws 42, so as to also be in revolving contact with a lower inner circular recess on plate 32. The form of the inner aperture of flange 41 corresponds with that of the aperture in plate 39.

43 is a ring inserted between cheeks 35, so as to be capable of revolving between them as well as of sliding along the same.

44 are blocks placed between said ring and flange 41 to maintain the same at a suitable distance from each other, and 45 are upright bolts passing through parts 43, 44, 41, and 39 successively. Plate 39 and flange 41 are provided with transversal slots 46 for receiving bolts 45, these bolts thus serving as means for guiding plates 32 and 39 and flange 41 laterally along the upper surface of annular frame 30.

47 47 are handles to the outer edge of plate 39 for the purpose of imparting to it and with it to ring 41 revolving motion within the aperture of plate 32.

The numeral 48 indicates a vertical standard connected by hinges 49 to a suitable flange 50 attached by screws 51 to plate 39. Said standard serves to support the frame carrying the operating-tool 52. It is provided with a large vertical face-plate 53 arranged parallel and even with one of the longitudinal edges of aperture 40. On the inner face of plate 53 a guide-piece 54 is adjustably secured by means of bolts 55 passing through curved concentric slots 56. Said guide-piece carries a screw-spindle 57, which meshes with a nut 58 in a vertical plate 59. The center for slots 56 lies in a horizontal plane containing the axis of spindle 57. There is a dovetailed joint provided between said plate and said guide-piece whereby the former is permitted to slide along the latter sidewise. 60 is another vertical plate, having its smooth rear surface so applied to the smooth front surface of plate 59 as to permit said plates to slide along each other.

61 is a bolt passing through the lower portions of plates 59 and 60, and 62 a jam-nut for holding said plates in close contact with each other, while the head 63 of said bolt bears against one of the straight inner surfaces of plate 39.

64 64 are concentrically-curved slots in the upper portion of plate 60, their common center coinciding with the axis of screw 61. 65 65 are bolts which are allowed to play within said slots, their ends being fixedly screwed into plate 59.

The numeral 66 indicates the tool-carrier constructed with a cylindrical channel for receiving a spindle 67 provided at its lower end with a proper socket 68 for receiving the tool-shank. Said carrier is capable of sliding vertically along plate 60, owing to a suitable dovetail connection between the two. 69 is a set-screw for securing the tool-shank in said socket, and 70 a set-screw which may be employed for holding spindle 67, and thereby tool 52, in a fixed position with reference to the tool-carrier.

71 is a handle in the form of a hand-wheel, fixedly attached to spindle 67, and 101 (shown in Fig. 1) a pulley likewise secured to said spindle, 72 being a spiral spring for holding said spindle and with it the tool normally in an elevated position while set-screw 70 is not being employed for holding the same.

The numeral 73 indicates a flat bar forming a lateral extension of plate 60. 74 is a pivot so screwed into said bar as to hold close to its face in detachable connection a lever 75 comprising the two segments 76 and 77, each provided on its outer surface with teeth. The teeth of segment 76 mesh with those of a pinion 78, which in turn mesh with those of a rack 79 attached to and forming part of tool-carrying frame 66. The teeth of segment 77 mesh with those of a rack provided on an upright post 80, which together with a horizontal bar 81, with which it is fixedly connected, has the configuration of an inverted T. Along the face of said bar 81 a dovetailed groove 82 is provided, and within the same the flange 83 of an upright post 84 is adjusted to slide, the lower extremity of said post being made wedge-shaped and adapted to slide along the upper surface of a horizontal lever 102. Said lever extends outward from plate 39, being hinged detachably to two lugs 103, provided on one of the straight sides of said plate, and being suitably braced, as shown more particularly in Fig. 7.

The numeral 85 indicates a roller pivoted to a fork 100 on the under side of lever 102. Said roller is adapted to travel along the undulating edge of rim 37.

86 is a set-screw for securing post 84 in any desired position along groove 82.

To the rear side of upright 80 a bar 87 is so dovetailed as to slide along the same longitudinally, the rear side of bar 87 being fixedly mounted on horizontal bar 73.

88 is a U-shaped bracket attached to the rear side of bar 87 and carrying between its jaws a nut 89, to which a horizontal handle 90 is attached.

91 is a screw-spindle of coarse thread and engaging with the thread in nut 89 and fixedly attached to the lower extremity of an angle-piece 92, the horizontal member of which extends forward over and beyond post 80, while its vertical member, to which said screw-spindle is attached, is provided with a vertical slot 93, the walls of which are capable of sliding along the shank of a bolt 94 screwed into the rear side of the bar 87. Angle-piece 92, when screwed down by turning nut 89, comes to rest on the top of bar 87.

95 is a nut secured to the upper portion of the face of post 80, and into this nut engages a finely-threaded screw 96. The shank of said screw extends upward through the horizontal member of angle-piece 92, and beyond a flange 97 attached to said shank 98 is a plate so secured by a screw 99 to the upper surface of said angle-piece as to confine aforesaid flange in contact therewith. The upper extension of said shank projects through plate 98, its end being squared so as to permit of attaching thereto a handle 100, by means of which said screw may be turned if desired, its shank and flange being left free to revolve within parts 92 and 98.

A pulley 101 may be fixedly attached to the upper extension of tool-spindle 67, as indicated in Fig. 1, for the purpose of revolving said spindle by mechanical means, and using in connection therewith a drill as a working tool when desired.

In order to be able to give to the vertical tool-supporting standard, and with it to the tool, various lateral movements in given directions in accordance with the horizontal configurations to be carved upon the stone, it is necessary to temporarily fixedly connect or attach to each other some or all of the various portions of the supporting-base of said machine, described heretofore as being capable of lateral movement along each other, as will be set forth more fully hereinafter. The means employed for bringing about such fixed connections are as follows: For preventing the movement of carriage 17 along rails 16 I attach to the under side of said carriage a shoe 104 (shown in Figs. 1 and 3) and provided with a flange through which one or more set-screws 105 pass, which latter engage with the top of rail 16 so as to thereby produce sufficient binding action between a contact-strip 106, fastened to the top of side bar 18ª of the carriage and the under side of stringer 21, as to prevent movement of said carriage. Other set-screws are employed as follows: 107 107 for confining together plate 29 and frame 30, 108 108 between frame 32 and guide-piece 31ª, and 109 between plate 39 and frame 32.

Instead of set-screws, as described, any other suitable fastening devices may be employed.

110 are bolts for detachably connecting serrated rim 37 with frame 32.

In the operation of the apparatus its various parts have to be adjusted and displaced with reference to each other in various ways, in accordance with the nature of the particular work to be done.

If straight planing is to be done, the stone to be cut should be so placed on the bed that after lowering the tool sufficiently it will be carried over its prescribed path in contact with the stone by the movement of the carriage along its rails, all the other portions of the base-supporting standard 48 being then fixedly connected with each other.

If simultaneous lateral displacement of the tool be desired, this can be done by turning screw-spindle 57 either by hand or by suitable power mechanism applied to its end. When a straight cut has been made parallel with the carriage-track and its end has been reached, the turning laterally of handle 90 will result in the raising of upright post 80 and thereby the raising of the cutting-edge of the tool from the part of the surface of the stone just traversed while the tool is being run backward over the same course, so as to prevent it from scraping the stone in its rearward movement. Generally in making moldings a narrow tool will be employed for producing streaks closely adjoining each other, which together will produce the desired profile, and a tool having a cutting-edge corresponding to said profile will afterward be passed over such series of streaks or lines jointly, so as to finish the surface of such molding. In making such a series of narrow streaks a molding of any suitable cross-section may be produced by moving the tool-casing laterally by means of screw-spindle 57 before commencing on a new streak and regulating the feed of the tool by raising and lowering it through the instrumentality of screw-spindle 96 actuated by handle 100.

If the tool be intended to travel successively in different straight directions and to thus produce an angular cut on the face of the stone, the tool may first be guided in one direction by the movement of the carriage along its rails, as described above, and when the angle-point has been reached the carriage is arrested in its movement by any suitable stop attached to the rails and will then have to be fixedly secured with reference to its track by means of set-screws 105, and after set-screws 107 have been temporarily loosened and frame 30 turned within plate 29 so as to give guides 31 and 31ª a direction corresponding with the direction of the second member of such angle, frame 32, and with it the tool, will have to be moved parallel with said guides while in proper contact with the stone.

In applying a cutting-edge to an angular molding such cutting-edge E would have to be placed parallel with the line of intersection I between the two members of said angular molding, as indicated in Fig. 11, and would have to be passed successively over the two members thereof and past the line formed by their intersection, the cutting-edge having proportionately larger dimensions laterally than a section of either member of the molding at right angles to its sides, in accordance with the angle to be described.

If it be intended to have the tool describe a circle, said tool would have to be displaced laterally with reference to the vertical axis of frame 32 by turning screw-spindle 57 sufficiently to produce the desired eccentricity, which would equal the radius of the circle to be described, and all the other parts of the base capable of lateral displacement having been fixedly secured to each other the revolving of plate 32 would produce the desired result.

If an oval configuration were to be produced, the relative position of disks 39 and 43 would first have to be changed so as to determine the breadth of the oval with reference to its length. This would be done by first loosening bolts 45, then causing disk 32 to slide along its dovetailed guides 31 and 31ᵃ, the bolts 45 at the same time sliding within the slots provided in plate 39, thus placing disk 39 eccentric to plate 43. When the required lateral displacement of said disks has been so obtained, screws 45 are tightened and the machine is ready for operation. The proportions of the oval to be cut are determined by placing disk 39 and plate 43 more or less eccentric to each other. In producing the oval configuration disk 39 is turned around and simultaneous with its rotary motion it receives a lateral movement by the sliding of plate 32 along guides 31 and 31ᵃ, and at the same time disk 43, which is firmly connected with plate 39, is caused to revolve and simultaneously slide forward and backward between guides 35, this sliding motion being at right angles to the sliding movement of plate 32 on guides 31 and 31ᵃ.

For the purpose of producing under-cuts the working tool must be given a suitable lateral inclination. This to a limited extent can be done by temporarily loosening screws 65 and using head 63 of screw 61 as a pivot for swinging plate 60 and with it the tool to the right or left, as may be required. This mode of varying the inclination of the tool is simple and readily accomplished. If such means, however, should not be sufficient, plate 54 may be swung along the face of plate 53 guided by bolts 55 within slots 56 until the tool assumes the desired inclination.

The principal advantages derived from the use of my improved apparatus refer to the reproduction of patterns upon stone either of the same size or according to a certain predetermined proportion. For this purpose I particularly employ bars, either curved in ground plan or straight as the case may be, having their upper edges curved or serrated, or varied in elevation in any desired way, and by moving the working tool with the aid of the means above described parallel with or along such bar and interposing between the edge of said bar and the tool a suitable transferring mechanism, whereby the movement of the portion of the transfer device in contact with such edge may be imparted to the tool in the same or in modified form. In so reproducing the configuration of the upper edge of circular rim 37 I make use of roller 85, causing the same to travel on top of said edge as plate 39 is being revolved. Movement of said roller is transferred through lever 102 to post 84, and from there to upright 80 and through the gearing (shown particularly in Fig. 3) to the tool-holder, and it will readily be seen that by using various levers 75, embodying two segments of different radii, the varying elevations over which roller 85 is so made to pass may be reproduced in different proportions. Thus if, as shown in Fig. 3, the outer segment, 77, be of much greater radius than the inner segment, 76, a considerable change in the elevation of roller 85 will produce but a slight modification in the elevation of the tool, and vice versa. As attaching and detaching segment-levers of different proportions is somewhat laborious, interferes with the continuous working of the apparatus, and at best cannot practically be made to cover all the variations in regard to the proportion in which a pattern may have to be reproduced, I avail myself of other means, furnished particularly by post 84 adapted to travel in sliding contact with bar 81, as well as with lever 102, for the purpose of producing such modifications, depending upon varying the proportions of segment-lever 75 principally only where changes of considerable extent have to be accomplished in that respect.

Referring again particularly to Fig. 3, it will be seen that the moving of post 84 toward or away from its fulcrum on plate 39 will reduce or increase the vertical movements of post 80 and with them of the tool in exact proportion to the change of leverage so produced, and that such change of leverage can be made entirely gradual, so as to thereby with the aid of varying the proportions of segment-lever 75 cover any change in the proportions between the pattern and the work to be produced that may be desired. Placing the bearing-point of post 84 directly above roller 85 will impart to upright 80 exactly the same variations in elevation as said roller encounters in its travels over the edge of rim 37, and it will therefore be seen that in such case the increase or reduction in relative elevations between the pattern and the stone will be governed entirely by the proportions given to the gearing between post 80 and the tool-casing.

While I prefer to use a roller to maintain operative contact with the edge of rim 37 during the operative movement of the contact device, as this does away largely with friction and will generally be feasible providing the roller be sufficiently small and the depressions in such edge of a curving configuration, it will be seen that for said roller a contact-piece adjusted to slide along such edge, particularly in the form of a blade, might be substituted.

The lower adjustable screw-threaded stop 96ᵃ is provided on upright 80 in line with screw-spindle 96 for the purpose of limiting the depth to which said screw-spindle, and with it bar 87, extension 73 and plate 60, which carries the tool-casing and the tool, may be lowered. If the proposed movement of the tool be in a straight line and it be intended to reproduce in such line an undulating or similar surface from a pattern, this will be done with the aid of a pattern in the form of a straight bar 133 detachably connected with stringer 21, a lever 102ª carrying a roller 75ª, all as shown in dotted lines in Fig. 3, being used for such purpose, the tool being then moved along such bar by running carriage 17 along its track.

While in the drawings particularly for the sake of clearness no mechanical means have been shown for moving laterally to each other the various portions of the apparatus which jointly with transverse bars 20 of the carriage form the base on which vertical tool-supporting standard 48 is mounted, it will be seen that such mechanism may readily be applied to such movable portions.

In making moldings or similar configurations with their surfaces undulating or serrated longitudinally in whole or in part I have found it to be advantageous and productive of the best results to first produce such moldings with a uniform surface longitudinally and then again go over the surfaces so furnished with the same tools, guiding the same, however, by means of the transferring device and the bars with undulating or serrated edges above described.

Figs. 8, 9, and 10 represent a modified construction of my apparatus simplified in many respects and providing only for longitudinal movement of the carriage 17 along its track and of movement of the tool-supporting standard in a straight line transversely to said track. The gearing of the transferring device is shown to be so proportioned as to make the carving on the stone produced by the machine an exact fac-simile of the pattern employed. In said construction a carriage 17 provided with transverse beams 20 is employed, as described above. The remaining portions of the apparatus embody a number of the details and of their combinations, as hereinbefore specified, but the main frame of the mechanism employed in this instance is made stationary with reference to the carriage, and for the purpose of stiffening it is adapted to be fitted to one of the cross-beams employed in the preceding figures, and to be fixedly connected therewith.

The numeral 111 indicates an additional transverse beam capable of being secured by bolts 112 to the longitudinal beams 18 18ª of the carriage in a position close to one of transverse beams 20 after the removal therefrom of plate 29, described above, and of all the parts of the apparatus resting thereon. As it is proposed to use this embodiment of the apparatus on the same carriage, as described above, transverse beam 111 is shown to be connected by a dovetail with the inner upper edge of one of the transverse beams 20, whereby said two beams will be practically consolidated into one beam and a secure and reliable support will be provided for the superstructure.

No mechanism is shown in Figs. 8, 9, and 10 for propelling the carriage along its track, as such mechanism has already been illustrated particularly in Figs. 1 and 2.

Along the rear portion of transverse beam 111 a rack 113 is provided.

114 is a block having its under side in dovetail engagement with the upper side of beam 111, whereby it is capable of sliding along the same.

115 is a screw-spindle mounted within a trough provided in beam 111, and 116 a handle for turning said screw-spindle.

117 is a recess in the under side of block 114 containing a block 118 provided on the reduced portion of the shank of a screw 119, which screw extends through the upper part of said block. The edges of block 118 are guided by and travel along the walls of said recess, as screw 119 is being screwed inward or outward.

120 is a sectional nut adapted to engage with the upper half of the thread on said screw 119. It is so attached to the lower end of the shank of screw 119 as to be compelled to fall and rise with the same, entering in the latter case recess 117. A pinion 121 with proper handle 122 is mounted in engagement with rack 113 on a pivot 123 fixedly attached to the rear side of block 114. When it is desired to give slow and very gradual movement to block 114 along transverse beam 111, nut 120 will have to be forced downward through the instrumentality of screw 119 until it comes in operative contact with screw 115, when the turning of handle 116 will produce such movement. On the other hand, when it is desired to give rapid movement to said block said sectional nut will correspondingly have to be withdrawn from contact with screw 115 and the revolving of pinion 121 by means of handle 122 will then produce such rapid movement.

123 is a bar fixedly secured by screws 124 to block 114. To said bar vertical tool-supporting standard 48 is secured by hinges 125. On said standard are mounted parts 52 to 82, inclusive, in substantially the same manner and holding the same relations to each other as described above, segments 76 and 77 in this case, however, being constructed with the same outer radius.

126 is a hand-lever fixedly attached to segment-lever 75.

127 is a nut with a dovetail rear projection adjusted to slide within groove 82, and 128 a screw-threaded pointer with proper handle 129. A bar 87 mounted on bar 73 is dovetailed to the rear side of bar 80 so as to be capable of sliding vertically along the same. A U-shaped bracket 88 with nut 89 having handle 90 and a screw-spindle 91 on an angle-piece 92 adjusted to be guided by slot 93 and bolt 94 are provided in connection with bar 87, as described above. A nut 95 is secured to the face of bar 80 near its upper end and a fine screw 96 passes through the same and the horizontal member of angle-piece 92. 97 is a flange on said screw which will limit its movement when being turned downward, this part of the apparatus, as illustrated particularly in Fig. 10, corresponding with that illustrated in the upper part of Fig. 4, the upper plate, 98, and its screw 99, however, being omitted. Screw 96 is so placed above lever 126 as to form an adjustable stop for it in its upward movement. A similar stop comprising a screw-spindle 96$^a$ guided in a nut on the lower part of the face of upright 80 is provided in line with screw 96 and underneath lever 126 so as to adjustably limit its downward movement.

The operation of this mechanism is in most respects similar to that above described. Undulating or serrated lines may be produced by the use of straight bar 133 provided with an undulating upper edge and a post carrying a roller and having its upper extremity adapted to slide within groove 82. Teeth 130 provided at the left-hand end of bar 81 are adapted to mesh with teeth in rack 79 when a lever 75 carrying segments of equal diameter is used, thus further insuring true movement of the transfer device while in operation. In the case as illustrated the tool 52' operated as a drill will in its vertical movements reproduce exactly the vertical movements of pointer 128 as the latter is successively lifted or carried from one portion of the pattern 131 to another portion.

Having thus described my invention, what I claim as new, and desire to secure by Letters Patent of the United States, is—

1. In a stone-carving machine, the combination with a bed of a pattern in the form of a bar having an edge of varying elevations, a transferring device adapted to move in contact with said bar, and comprising a section having horizontal guide-surfaces adapted to engage with proper surfaces on another section, and also a fulcrumed section portions of which are adapted to swing up and down and to engage with proper surfaces on another section and means for raising and lowering the tool in varying proportion with the elevations on the edge of said bar, substantially as set forth.

2. In a stone-carving machine, the combination with a bed, of a pattern in the form of a bar having an edge of varying elevations, a tool, a device adjusted to travel in contact with said edge, a frame capable of vertical movement actuated by said contact device, a connecting device between the frame and said contact device, adjustable in length, and intermediate devices between said frame and the tool-holder for simultaneously varying their elevations, and comprising a toothed segment and a pinion, substantially as set forth.

3. In a stone-carving machine, the combination with a bed, of a pattern in the form of a bar having an edge of varying elevations, a tool, mechanism for moving it along said bar, a lever fulcrumed to a base on which the tool is mounted, a contact device between said lever and said edge, a second contact device capable of lateral adjustment along said lever and gearing between the tool-holder and said second contact device for simultaneously varying their elevations, substantially as set forth.

4. In a stone-carving machine, the combination with a bed, of a pattern in the form of a bar having an edge of varying elevations, a tool, a device adjusted to travel in contact with said edge, and connecting mechanism interposed between said contact device and said tool and comprising a detachable toothed segment and a rack and means for securing said rack in varying positions with reference to the axis of the tool, substantially as set forth.

5. In a stone-carving machine, the combination with a bed, of a pattern in the form of a bar having an edge of varying elevations, a tool, a device adjusted to travel in contact with said edge and connecting mechanism comprising two racks one attached to the tool-holder, the other actuating the contact device, and a pinion and a toothed lever carrying two segments, substantially as set forth.

6. In a stone-carving machine, the combination with a bed, of a pattern in the form of a bar having an edge of varying elevations, a tool, a lever fulcrumed to a base on which the tool is mounted, a contact device between said lever and said edge, a transferring-frame interposed between said lever and the tool-holder and a second contact device capable of adjustment along said lever and also along said frame, substantially as set forth.

7. In a stone-carving machine, an adjusting device for the tool, comprising a post as 80 combined with means for transferring to it vertical movement from a contact-piece in engagement with a pattern, a frame carrying the tool, said post being capable of lateral adjustment with reference to said frame, and a screw-spindle, as 96, in engagement with said post and said frame, and adapted to adjust the relative elevations of the adjoining portions of said post and said frame, substantially as set forth.

8. In a stone-carving machine, a combined adjusting and lifting device for the tool, comprising a post, as 80, combined with means for transferring to it vertical movement from a contact-piece in engagement with a pattern, a frame carrying the tool, said post being capable of lateral adjustment with reference to said frame and a screw-spindle, as 96, in engagement with said post and frame, and adapted to adjust the relative elevations of the adjoining portions of said post and said frame, said frame being constructed in sections capable of vertical displacement with reference to each other, substantially as set forth.

9. In a stone-carving machine, a combined adjusting and lifting device for the tool, comprising a post, as 80, combined with means for transferring to it vertical movement from a contact-piece in engagement with a pattern, a frame carrying the tool and placed in adjustable contact with said post, means for raising and lowering said post and said frame with reference to each other, said frame being constructed in sections capable of vertical movement with reference to each other, and a screw, for producing such vertical movement, substantially as set forth.

10. In a stone-carving machine, the combination with a bed, of a tool-holder mounted on a supporting-frame, a transferring device in operative engagement with such tool-holder and containing a contact-piece adapted to pass along a pattern and containing also a member, as 80, nut 95 and fine screw 96 for feeding the tool downward, and angle-piece 92 having coarser screw 91 with proper handle-nut, all substantially as set forth.

11. In a stone-carving machine, the combination with a bed, of a tool-holder mounted on a supporting-frame, a transferring device in operative engagement with such tool-holder and comprising a contact-piece and a lever having a fulcrum-piece capable of lateral displacement with reference to the tool-holder and gearing interposed between said lever and the tool-holder, substantially as set forth.

12. In a stone-carving machine, the combination with a bed, of a tool-holder, provided with a suitable rack, a transferring device in operative engagement therewith and provided with a rack and comprising a toothed segment coacting with said racks, a hand-lever for actuating said segment, and adjustable stops for limiting its movements, substantially as set forth.

13. In a stone-carving machine, the combination with a bed, of a tool-holder, provided with a suitable rack, a transferring device in operative engagement therewith and provided with a rack and comprising a toothed segment coacting with said racks, and a hand-lever for actuating said segment, substantially as set forth.

Signed at New York, in the county of New York and State of New York, this 14th day of September, A. D. 1894.

ANTONIO ZANARDO.

Witnesses:
S. B. ZANARDO,
W. SAMESON.